US006792659B1

(12) United States Patent
Gulmezian

(10) Patent No.: US 6,792,659 B1
(45) Date of Patent: Sep. 21, 2004

(54) TRANSMISSION TOOL

(76) Inventor: Onnik Gulmezian, 50-36 41st St., Sunnyside, NY (US) 11104

( * ) Notice: Subject to any disclaimer, the term of this patent is extended or adjusted under 35 U.S.C. 154(b) by 0 days.

(21) Appl. No.: 10/688,728

(22) Filed: Oct. 20, 2003

(51) Int. Cl.[7] .................................................. B23P 19/04
(52) U.S. Cl. .............................. 29/263; 29/265; 29/278
(58) Field of Search .......................... 29/263, 265, 278, 29/255, 272, 280, 282

(56) References Cited

U.S. PATENT DOCUMENTS

| | | | | |
|---|---|---|---|---|
| 5,228,180 A | * | 7/1993 | Bauer et al. | 29/263 |
| 5,379,503 A | * | 1/1995 | Fakult | 29/265 |
| 5,555,613 A | * | 9/1996 | Schmidt et al. | 29/263 |
| 6,619,645 B1 | * | 9/2003 | Rottler et al. | 269/296 |

* cited by examiner

*Primary Examiner*—Lee D. Wilson

(57) ABSTRACT

A transmission tool (10) having a jig (12) which has a jig body (12A) securely connected at a front distal end to a jig first member (12B) and further securely connected at a rear distal end to a jig second member (12D), the jig body (12A) has a jig second member pin (12DA) extending outwardly therefrom. A hollow jig cylinder (12C) is positioned through the jig body (12A) and the jig first member (12B) and the a jig second member (12D). A reamer (14) has a reamer collar (14A) having a threaded cylinder centrally positioned there through. The reamer collar (14A) has a reamer collar channel (14AA) therein. The reamer (14) further has a reamer shaft (14B) having a reamer shaft thread (14BB) positioned at a back distal end thereof. The reamer shaft (14B) further has a reamer shaft cutter (14BA) positioned at a front distal end thereof. An inserter (16) has a slightly smaller diameter then the reamer collar channel (14AA). The inserter (16) further has an inserter male member (16A) having a slightly smaller diameter then a bushing (18).

6 Claims, 4 Drawing Sheets

TRANSMISSION TOOL

BACKGROUND OF THE INVENTION

1. Field of the Invention

The present invention relates to a transmission tool. More particularly, the present invention relates to a transmission tool allowing easy replacement of a worn out bushing.

2. Description of the Prior Art

Numerous innovations for transmission tool have been provided in the prior art that are described as follows. Even though these innovations may be suitable for the specific individual purposes to which they address, they differ from the present invention as hereinafter contrasted.

In U.S. Pat. No. 5,379,503, invented by, Fakult, invented by, Extraction tool for transmissions, an extraction tool for transmission or the like units comprising a long tubular body enclosing a rotatably mounted operating part having an expansible gripping unit at one end to engage withing a mating part, and a handle at the opposite end to rotate the operating part to cause the gripping unit to in turn grip said mating part to facilitate withdrawal of clutch and gear units or the like in which the mating part is positioned.

In U.S. Pat. No. 5,345,845, invented by, Myers, invented by, Right angle torque transmission tool, a torque transmission tool is arranged to direct torque application from a torque wrench to an associated fastener. To this end, an elongate housing is arranged to receive torque from a first end of the housing and direct such torque through gear inter-engagement to a driven shaft having a through-extending polygonal bore arranged to receive various inserts therewithin for directing torque transmission to various tools and fasteners.

In U.S. Pat. No. 4,586,228, invented by, Rodolf, invented by, Tool kit for installing transmission seals, a composite seal-installing driver includes an elongated base or handle portion with a socket in one end and any selected one of a plurality of interchangeable adapters each having an end projection manually fittable in the base socket so as to connect the base and the adapter. Each adapter has a flat flange for engaging the back of an annular seal to be installed in the hole of the transmission housing into which a shaft of the transmission projects and a central cylindrical projection over which the seal ring is fitted and slid rearward into engagement with the flange. The cylindrical projection is fitted into the transmission housing hole and guides movement of the seal toward the hole. Force is applied to the base of the driver to press-fit the seal into the hole. The diameters and lengths of the central projections of the adapters vary so that, by selecting the appropriate adapter, seals of different sizes can be installed in transmissions of different manufacturers.

In U.S. Pat. No. 4,583,275, invented by, Diaz, invented by, Transmission direct clutch drum removing and installing tool, a transmission direct clutch drum removing and installing tool for use on a General Motors Corporation Turbo-Hydromatic 400 automatic transmission. The tool comprises a round plate platform base (20) and a spacer channel (26) attached to its periphery, each having an opening in the center. A plurality of legs (30), each having a retainer (34) on its lower end, are pivotally connected to the bottom of the base (20). A T-shaped operating handle slideably penetrates the opening in the base (20) and channel (26), and contains a leg directing expansion guide disc (40) on the end opposite the handle grip. Between the base (20) and disc (40) is a free floating locking disc (46) that assures the alignment of the legs (30) without binding or internal bowing. To operate the tool, the handle extended allowing the legs (30) to be grouped together and placed within the sides of the clutch drum. When the handle section (36) is pushed downwardly, the legs (30) are forced outwardly grabbing the sides of the clutch drum. Thus, allowing the operator to remove or install the clutch drum.

The above patented inventions differ from the present invention because they fail to describe or claim at least one combination of the following features depicted in the present invention: jig, jig first member with jig first member shroud, jig second member pin, reamer, reamer collar, reamer shaft thread, reamer shaft cutter, and reamer shaft nut.

Numerous innovations for transmission tools have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a transmission tool. More particularly, the present invention relates to a transmission tool allowing easy replacement of a worn out bushing.

The types of problems encountered in the prior art are transmission bushing replacement requires disassembly of the transmission.

In the prior art, unsuccessful attempts to solve this problem were attempted namely: various tools to facilitate transmission disassembly. However, the problem was solved by the present invention because the bushing can be changed transmission without disassembling the transmission.

Innovations within the prior art are rapidly being exploited in the field of facilitating mechanical labor required to perform routine transmission repairs.

The present invention solved a long felt need for an easy two step process to replace a worn out bushing without disassembly of the transmission.

Accordingly, it is an object of the present invention to provide a transmission tool having a jig, reamer, and inserter.

More particularly, it is an object of the present invention to provide a jig having a jig body, jig first member with a jig first member shroud, a jig cylinder, and a jig second member with a jig second member pin.

In keeping with these objects, and with others which will become apparent hereinafter, one feature of the present invention resides, briefly stated, in the reamer having a reamer collar with a reamer collar channel, reamer shaft, reamer shaft cutter, reamer shaft thread, and reamer shaft nut.

When the inserter is designed in accordance with the present invention, it has a inserter male member upon which a bushing is positioned.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10 - transmission tool (10)
12 - jig (12)
12A - jig body (12A)
12B - jig first member (12B)
12BA - jig first member shroud (12BA)
12C - jig cylinder (12C)

12D - jig second member (12D)
12DA - jig second member pin (12DA)
14 - reamer (14)
14A - reamer collar (14A)
14AA - reamer collar channel (14AA)
14B - reamer shaft (14B)
14BA - reamer shaft cutter (14BA)
14BB - reamer shaft thread (14BB)
14BC - reamer shaft nut (14BC)
16 - inserter (16)
16A - inserter male member (16A)
18 - bushing (18)

DESCRIPTION OF THE PREFERRED EMBODIMENT

Figure 1:
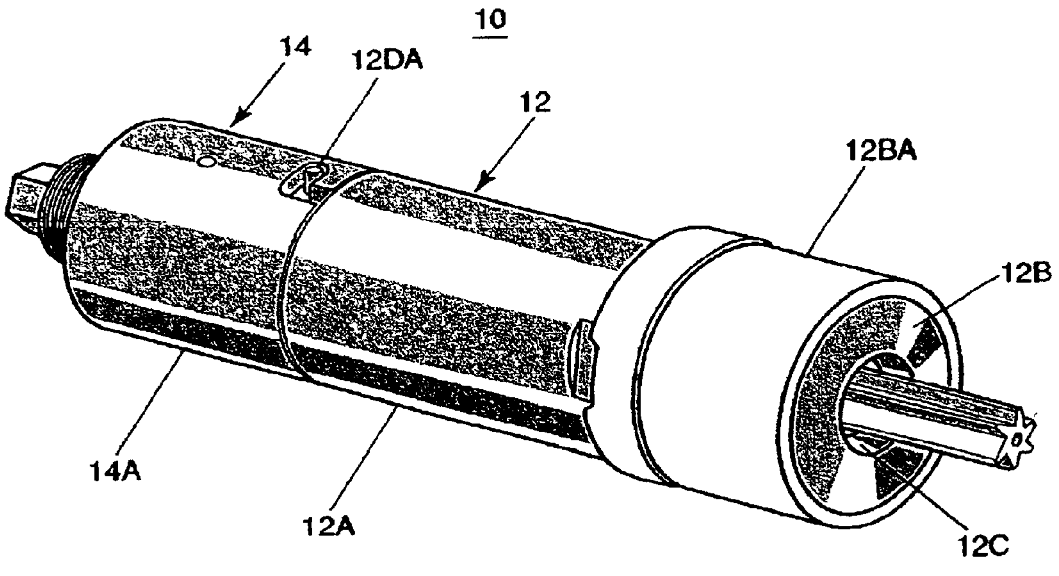
FIG. 1 is a top front perspective view of a transmission tool (10) exhibiting a reamer (14) inserted into a jig (12).
Figure 2:
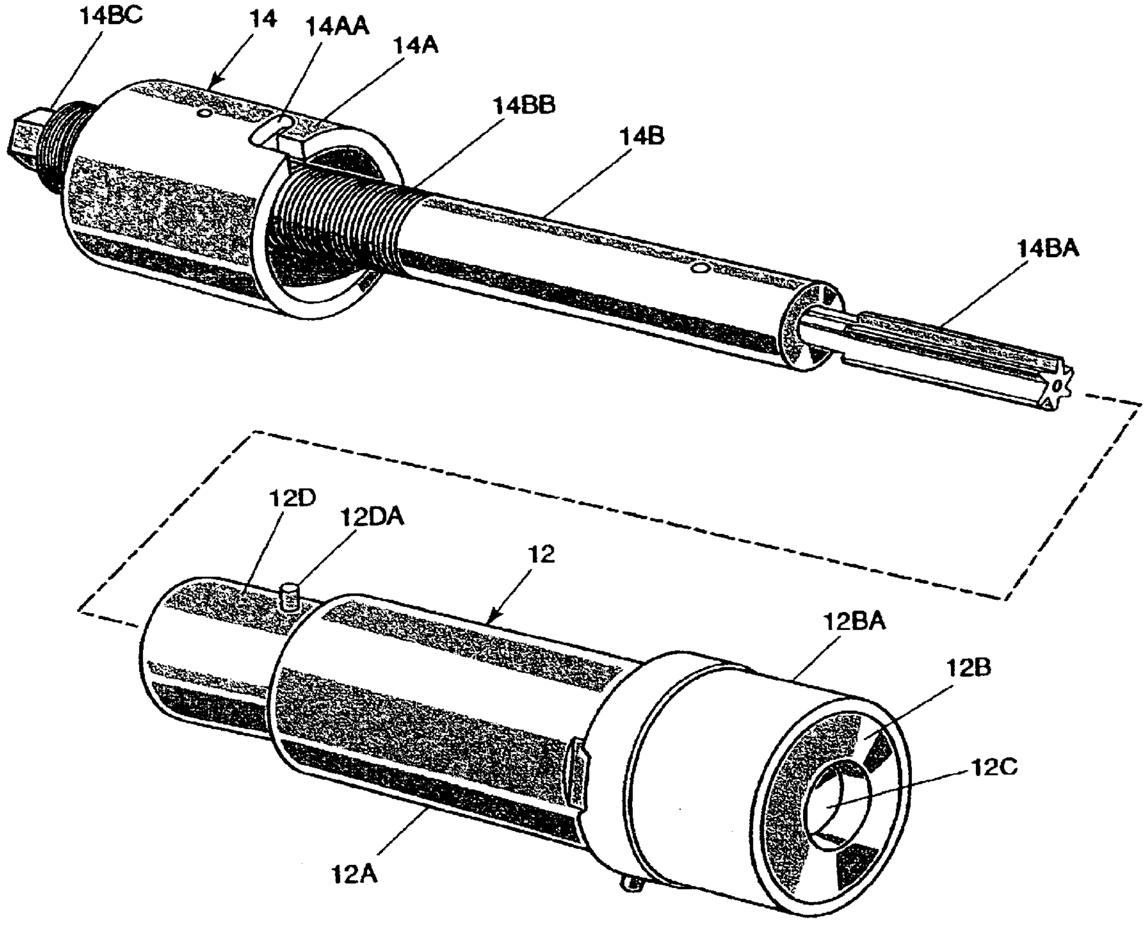
FIG. 2 is a top front perspective view of a transmission tool (10) exhibiting a reamer (14) being inserted into a jig (12).

Referring to FIG. 1 and FIG. 2 which are a top front perspective views of a transmission tool (10) exhibiting a reamer (14) inserted into a jig (12) and a reamer (14) being inserted into a jig (12), respectively. The transmission tool (10) comprises a jig (12) having a jig body (12A) securely connected at a front distal end to a jig first member (12B) and further securely connected at a rear distal end to a jig second member (12D). The jig first member (12B) preferably comprises a jig first member shroud (12BA) positioned around an outer surface thereof. The jig first member shroud (12BA) functions to protect the inside of the transmission opening when during removal and insertion of the bushing. The jig first member shroud (12BA) is manufactured from a material selected from a group consisting of plastic, plastic composite, nylon, rubber, and rubber composite. The jig second member (12D) comprises a slightly smaller diameter then a diameter of the jig body (12A). The jig body (12A) comprises a jig second member pin (12DA) extending outwardly therefrom. A hollow jig cylinder (12C) is positioned through the jig body (12A) and the jig first member (12B) and the a jig second member (12D).

The transmission tool (10) further comprises a reamer (14) having a reamer collar (14A) with a threaded cylinder centrally positioned there through. The reamer collar (14A) comprises a reamer collar channel (14AA) therein. The reamer (14) further comprises a reamer shaft (14B) having a reamer shaft thread (14BB) positioned at a back distal end thereof. The reamer shaft (14B) comprises a slightly smaller diameter then a diameter of the jig cylinder (12C) to enable it to be rotatably mounted therein. The reamer shaft (14B) further comprises a reamer shaft nut (14BC) securely attached at a rear distal end thereof. The reamer shaft (14B) further comprises a reamer shaft cutter (14BA) positioned at a front distal end thereof. The reamer shaft cutter (14BA) is preferably removably attachable to the reamer shaft (14B) which enables a user to exchange the cutting apparatus when it becomes dull during use.

The jig (12), reamer (14), and inserter (16) are manufactured from a material selected from a group consisting of steel, stainless steel, and titanium.

Figure 3:
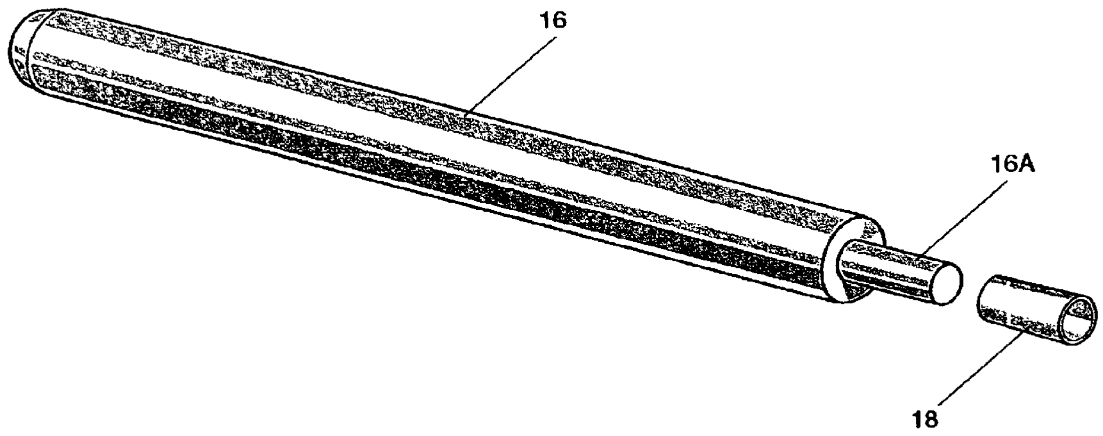
FIG. 3 is a top front perspective view of an inserter (16) exhibiting a bushing (18) being inserted thereon.
Figure 4:
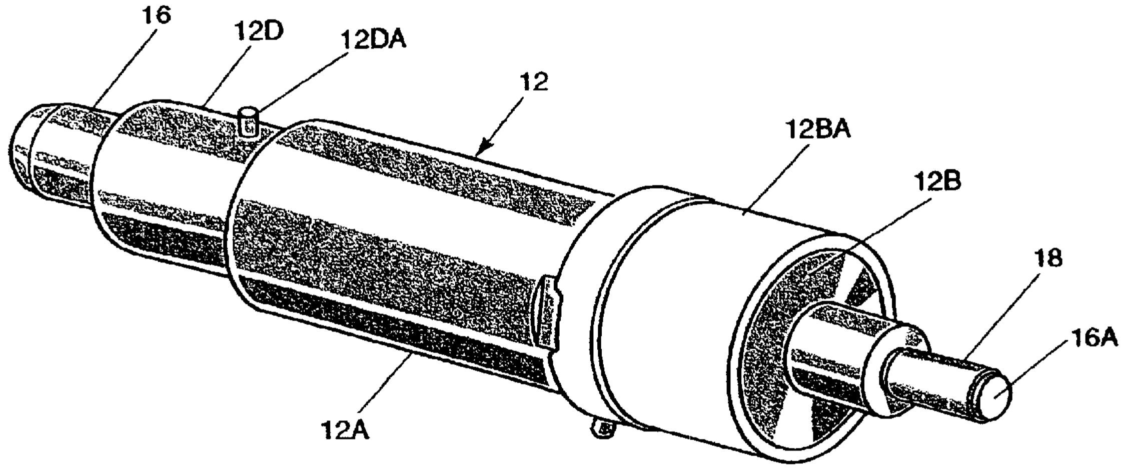
FIG. 4 is a top front perspective view of an inserter (16) positioned within a jig (12).

Referring to FIG. 3 and FIG. 4 which are a top front perspective view of an inserter (16) exhibiting a bushing (18) being inserted thereon and an inserter (16) positioned within a jig (12) having a bushing (18) positioned on a inserter male member (16A), respectively. The inserter (16) has a slightly smaller diameter then the reamer collar channel (14AA) allowing a user to easy insertion there through. The inserter (16) further comprises an inserter male member (16A) having a slightly smaller diameter then a bushing (18).

A user securely positions the jig (12) on a transmission by inserting the jig first member (12B) into a complimentary opening therein. The jig (12) is securely held in place by a fastening device securely attached to the transmission housing. After the jig (12) is securely positioned at a proper angle to the transmission housing, the user inserts the reamer (14) into the jig (12) positioning the reamer shaft (14B) into the jig cylinder (12C) and concurrently the jig first member shroud (12BA) over the jig second member (12D). The jig second member pin (12DA) is positioned within the reamer collar channel (14AA) locking both pieces together. The use then rotates the reamer shaft (14B) by utilizing a socket wrench on the reamer shaft nut (14BC) until the reamer shaft cutter (14BA) extends into and removes the pre-existing worn out bushing. After the old bushing and its pieces are removed, the use disengages the reamer (14) from the jig (12) and inserts the inserter (16) through the jig cylinder (12C). A new bushing (18) is positioned on the inserter male member (16A) which is inserted into position where the old worn out bushing was located. The job is completed after insertion of the new bushing when the jig (12) and inserter (16) are removed and de-fastened from the transmission housing.

It will be understood that each of the elements described above, or two or more together, may also find a useful application in other types of constructions differing from the type described above.

While the invention has been illustrated and described as embodied in a transmission tool, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A transmission tool (10) comprising:

A) a jig (12) which comprises a jig body (12A) securely connected at a front distal end to a jig first member (12B) and further securely connected at a rear distal end to a jig second member (12D), the jig second member (12D) comprises a slightly smaller diameter then a diameter of the jig body (12A), the jig body (12A) comprises a jig second member pin (12DA) extending outwardly therefrom, a hollow jig cylinder (12C) is positioned through the jig body (12A) and the jig first member (12B) and the a jig second member (12D);

B) a reamer (14) comprises a reamer collar (14A) having a threaded cylinder centrally positioned there through, the reamer collar (14A) comprises a reamer collar channel (14AA) therein, the reamer (14) further comprises a reamer shaft (14B) having a reamer shaft thread (14BB) positioned at a back distal end thereof, the reamer shaft (14B) comprises a slightly smaller diameter then a diameter of the jig cylinder (12C), the reamer shaft (14B) further comprises a reamer shaft cutter (14BA) positioned at a front distal end thereof; and C) an inserter (16) comprises a slightly smaller diameter then the reamer collar channel (14AA), the inserter (16) further comprises an inserter male member (16A) having a slightly smaller diameter then a bushing (18).

2. The transmission tool (10) as described in claim 1, wherein the jig first member (12B) comprises a jig first member shroud (12BA) positioned around an outer surface thereof.

3. The transmission tool (10) as described in claim 1, wherein the reamer shaft (14B) further comprises a reamer shaft nut (14BC) securely attached at a rear distal end thereof.

4. The transmission tool (10) as described in claim 1, wherein the jig (12), reamer (14), and inserter (16) are manufactured from a material selecte jig first member shroud (12BA) d from a group consisting of steel, stainless steel, and titanium.

5. The transmission tool (10) as described in claim 1, wherein the jig first member shroud (12BA) is manufactured from a material selected from a group consisting of plastic, plastic composite, nylon, rubber, and rubber composite.

6. The transmission tool (10) as described in claim 1, wherein the reamer shaft cutter (14BA) is removably attachable to the reamer shaft (14B).

* * * * *